Aug. 31, 1965  D. I. BOHN  3,203,509
SELF-ADJUSTING HYDRAULIC BRAKES
Original Filed Sept. 12, 1960
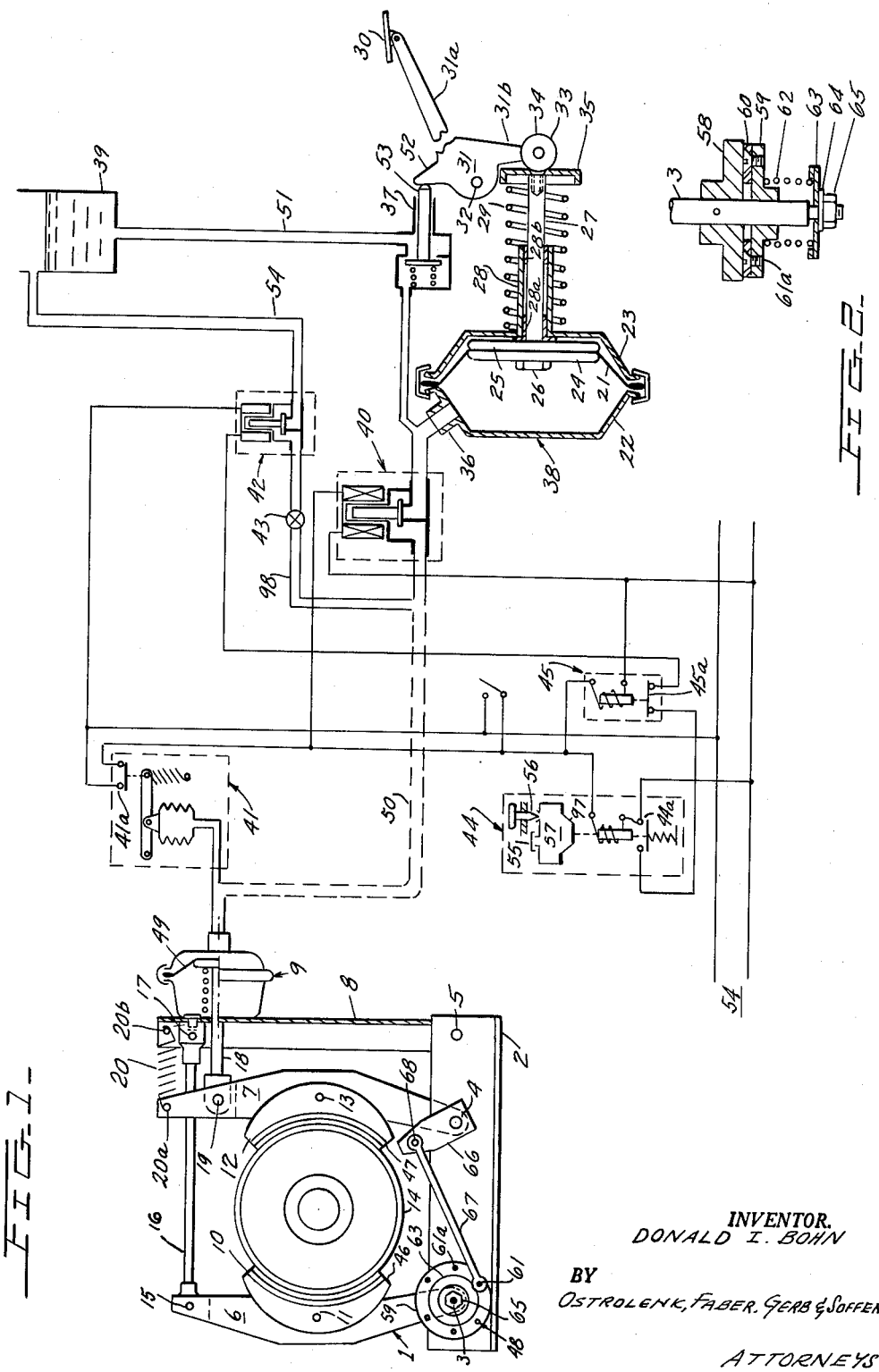
INVENTOR.
DONALD I. BOHN
BY
OSTROLENK, FABER, GERB & SOFFEN
ATTORNEYS

United States Patent Office 3,203,509
Patented Aug. 31, 1965

3,203,509
SELF-ADJUSTING HYDRAULIC BRAKES
Donald I. Bohn, Battery Park Hotel, Asheville, N.C.
Original application Sept. 12, 1960, Ser. No. 55,381, now abandoned. Divided and this application July 23, 1964, Ser. No. 385,558
1 Claim. (Cl. 188—75)

The present application is a division of the now abandoned application Serial No. 55,381, filed September 12, 1960, and relates to means for automatically centering and adjusting the positions of the brake shoes of a hydraulic brake relative to the drum to compensate for wear of the brake linings.

In hydraulic brakes for industrial use, such as overhead cranes, larry cars, and whirter cranes, the need for self adjustment of brake shoes becomes acute as the brakes are not readily accessible, and further mechanical adjustment of the brakes results in considerable time delay as the equipment must be stopped to adjust the brakes.

The self-adjusting brake of this invention includes a metering device which is placed in the return line of the system and connects the device which supplies the pressure from the brake shoe to the reservoir. When the pressure in the system on falling has reached a preset level, the metering device automatically operates to allow fluid to flow back to the reservoir at a predetermined rate. After a predetermined interval of time, the metering device is shut off. The volume of fluid which flows back to the reservoir corresponds to the distance the brake shoes move away from the brake drum. Thus, the brake shoe will always back away from the brake drum by a predetermined distance corresponding to the volume of fluid which has flowed through the metering device, regardless of the amount of wear of the brake shoe linings.

A novel clutching arrangement is provided to assure that the brake shoes are centered with respect to the brake drum thereby assuring equalized wear of the shoes.

Accordingly, an object of my invention is to provide novel means for the automatic adjustment of brake shoes in a hydraulic brake.

Another object of my invention is to provide a novel device to produce even wear on the brake shoe linings.

Still another object of my novel device is a novel self-centering means which insures that each brake shoe moves an equal distance from the periphery of the brake drum when the brake is released.

A further object of my invention is to prevent the brake shoes dragging on the brake drum when the brake is in its released position.

A still further object of my invention is to insure the brake shoes apply equal pressure, even thought there is unequal wear on the linings.

The foregoing and many other objects of my invention will become apparent in the following description and drawings in which:

FIGURE 1 is a side elevation, partly in schematic form, of a brake system constructed in accordance with my invention, and FIGURE 2 shows a cross-sectional view of the automatic self-centering mechanism clutch along the lines 2—2 of FIGURE 1.

Referring first to FIGURE 1, the brake assembly proper is indicated at 1. Base 2, composed of spaced angles, pivotally supports shafts 3 and 4. Brake arms 6 and 7 are rigidly fastened to shafts 3 and 4, respectively, and are therefore rotatable with respect to base 2. Brake shoes 10 and 12, having linings 46 and 47, respectively, rigidly secured thereto, are mounted to brake arms 6 and 7 by means of pins 11 and 13, respectively. These two joints are provided with a functional means, of a type well known to the art, to prevent rubbing of the brake shoes on brake drum 14 when a distance sufficient for clearance of both brake shoes exist.

Brake drum 14 is connected to the output shaft of the machinery to be protected by any conventional means, well known to the art.

An automatic shoe centering device 48 insures that both shoes apply equal pressure even though there is unequal wear of the shoes. The device consists of frictional clutch member 58, pinned or otherwise, secured to shaft 3. A similar member 59 rides freely on shaft 3 and carries friction lining 60 which is fastened to the inner face of 59 by means of screws 61a.

A compression spring 62 is squeezed between member 59 and spring seat 63. Spring seat 63 is free on a reduced diameter outer portion of shaft 3, and maintains the spring load by means of ball thrust bearing 64 and nut 65.

Crank 66 is pinned to shaft 4, and its slight angular rotation, opposite to clutch member 58 is transmitted to the latter by means of link 67 and pins 61 and 68.

Each time the brake is applied, clutch members 58 and 59 will take a certain relative position, and each time the brake is released, the shoes will have the same clearance to brake drum 14, since as shoe 12 backs away from drum 14, centering member 66 pivots clockwise causing rod 67 to pivot clutch member 59 counterclockwise through the same angular distance. When the brake is released, clutch members 58, 59 pivot in unison.

Braking power is transmitted to the brake arms by means of receiver 9 rigidly secured to channel 8. Channel 8 is pivotally mounted to base 2 by means of pin 5. Receiver 9 includes diaphragm 49 which moves pressure rod 18 in response to a hydraulic pressure existing in the receiver on the side of diaphragm 49 opposite rod 18. Receiver 9 in the present embodiment of my invention is a commercially available unit called "Robotair Chamber," made by Bendix-Westinghouse Corporation and described in their bulletin, Robotair Industrial Air Control.

Pressure rod 18 is connected to the upper end of brake arm 7 by means of clevis and pin 19. Similarly, rod 16 connects brake arm 6 to channel 8 by means of pin 15 at one end of rod 16, and pin 17 at the other.

Tension spring 20 is connected between brake arm 7 and channel 8 by having one end of spring 20 hooked around pin 20a at the top of brake arm 7 and the other end hooked around pin 20b on channel 8. Tension spring 20 biases brake shoes 10, 12 away from brake drum 14 and produces a substantially constant force of approximately 160 lbs., resulting in a back pressure on the hydraulic system of approximately 10 p.s.i. since the area of diaphragm 49 is approximately 16 square inches.

Receiver 9 responds to changes in the hydraulic pressure of the system which are initiated by transmitter 38, whose outlet 36 is connected through solenoid valve 40 to receiver 9 by means of line 50. The purpose of solenoid valve 40 will be hereinafter explained. Transmitter 38 changes the foot energy of the operator, who wishes to brake the equipment, into hydraulic pressure which actuates brake assembly 1 in a manner to be hereinafter described.

Transmitter 38 consists of a cup-shaped diaphragm 21 whose peripheral region is clamped between two metal cups 22 and 23. Diaphragm 21 has a center hole and is pinched tightly between discs 24 and 25 by means of nut 26 in threaded engagement with operating rod 27. Cup 23 is provided with an integral sleeve 28, with bushings 28a, 28b in sleeve 28 carrying operating rod 27. Spring 29 surrounds sleeve 28 and rod 27 and rests between cup 23 and spring cup 35, which is securely affixed to operating rod 27. Spring 29 forces the assembly comprised of elements 21, 24, 25, 26 and 27 to the right, as shown in FIGURE 1.

Foot pedal 30 is fastened to arm 31a of crank 31 which pivots about pin 32. Roller 33, on pin 34 at the end of crank arm 31b, contacts the outer flat surface of spring cup 35 so a downward pressure on pedal 30 will force diaphragm 21 to the left, expelling fluid out of transmitter 38 through outlet 36 thereof. The viscosity of the fluid remains constant over a wide temperature range. Spring 29 forces pedal 30 upwards when it is released. In the upward position of pedal 30 (FIGURE 1), extension 52 of crank 31 engages piston 53 of poppet valve 37 to open this valve. Poppet valve 37 hydraulically connects transmitter 38 to an open top fluid reservoir 39 by means of line 51.

The reservoir 39 is normally near transmitter 38, but must be a foot or so above transmitter 38, or receiver 9, whichever is highest.

Since there are no piston-cylinder arrangements and the top of reservoir 39 is the only opening to the atmosphere in the system, the need for bleeding is eliminated. That is, in a piston-cylinder arrangement, a vacuum is produced in the cylinder chamber when the piston is moved, thus, in addition to the fluid rushing in to fill the void, air is also sucked in. Although I provide solenoid valves and a poppet valve in my system, neither of these devices causes a vacuum which will suck in air as the pistons are not confined in cylinder, but are surrounded by the fluid of the medium.

As previously mentioned, solenoid valve 40 is positioned in line 50, between transmitter outlet 36 and receiver 9. Valve 40 is a normally closed solenoid valve which operates like a check valve when it is deenergized. That is, valve 40 when deenergized permits flow of the fluid from transmitter 38 to receive 9, but prevents flow in the reverse direction unless energized.

A pressure switch 41 is mounted close to receiver 9 and hydraulically connected to line 50. The switch 41 of the present invention is adjusted to close its contacts on a rising pressure at a value in excess of its opening pressure, typically in the range of 20 to 30 p.s.i., and opens on a falling pressure in excess of the back pressure on the system exerted by spring 20, typically 15 p.s.i.

The values at which pressure switch 41 will open or close should be set as close together as practical and as close as practical to the back pressure exerted by spring 20 with the pressure opening contacts 41a being above the back pressure exerted by spring 20 and below the pressure for closing contacts 41a.

The metering device of the system consists of solenoid valve 42, needle valve 43, relay 45 and time delay relay 44. The coils of devices 44, 45 and 40 are connected in electrical parallel to a source of electrical energy 54, through the normally open contacts 41a of pressure switch 41. Thus, when switch 41 closes, the devices 40, 44 and 45 are energized.

Solenoid valve 42 is provided with a much smaller orifice than solenoid valve 40, but is otherwise similarly constructed. Valve 42 is hydraulically connected to line 50 at a point between receiver 9 and valve 40, and to reservoir 39 through line 54. When deenergized, valve 42 is closed, preventing the fluid from flowing therethrough. The coil of solenoid valve 42 is connected in electrical series with the normally open contacts 44a of time delay relay 44 and the normally closed contacts 45a of relay 45 to a source of electrical energy. Thus, solenoid valve 42 is energized only when contacts 44a and 45a of both relays 44 and 45, respectively, are closed.

Needle valve 43 is placed in fluid line 98 connecting line 50 and solenoid valve 42 to permit accurate adjustment of fluid flow to the top of reservoir 39.

Pneumatic time delay relay 44 is a standard device. When energized, its plunger goes upward instantaneously to close contacts 44a, being unrestrained by the diaphragm 97 which is forced upward, the air in the small chamber 57 being released by check valve 55 on top. Time delay opening occurs when relay 44 is deenergized. The contacts remain closed for a period of time such as one or two seconds. This is accurately adjustable by needle valve 56 at the top of air chamber 57.

Relay 45 is a conventional instantaneous relay with contacts 45a normally closed.

Having now described the structural arrangement of the preferred embodiment of my invention, I will now describe its operation.

First, I assume the brake has been in normal operation. The diaphragm 49 is to the left of the right-hand position shown in FIGURE 1; spring 20 thus causes diaphragm 49 to exert a back pressure of 10 p.s.i. in the hydraulic system, brake shoes 10 and 12 clear brake drum 14 by the desired clearance, normally $\frac{1}{32}''$ or less. Poppet valve 37, being in the open position, assures the system is full of fluid.

The operator now actuates the brake by stepping on pedal 30 forcing it in a downward direction and releasing piston 53 to thereby close valve 37. Diaphragm 21 moves to the left forcing fluid out of transmitter outlet 36, through valve 40, into receiver 9.

The fluid entering receiver 9 forces diaphragm 49, and therefore rod 18, toward the left. Rod 18, attached to brake arm 7, forces brake shoe 12 towards the brake drum. The reaction causes channel 8 to rotate clockwise forcing brake shoe 10, attached to brake arm 6, towards the brake drum, by means of rod 16. The line pressure stays practically constant until the brake shoes firmly contact the brake drum 14.

The pressure then begins to rise as fluid continues to flow to receiver 9, the stretch and distortion of the brake parts requiring this extra fluid as the pressure rises.

When approximately 25 p.s.i. is reached, contacts 41a close, thereby energizing the coils of 44, 45 and 40. Thus, contacts 44a close, contacts 45a open, and solenoid valve 40 opens. Since contacts 45a are open, solenoid valve 42 is still deenergized. During this period valve 42 is not even momentarily energized since the opening of the contacts of relay 45 precedes the closing the contacts of time delay relay 44. This is caused by the fact that a slight retarding force is exerted on the plunger of relay 44 even on closing whereas no retarding force is exerted upon the plunger of relay 45.

The value of the force on the brake drum is dependent upon the pedal pressure and therefore the resulting fluid pressure, the normal maximum being about 110 p.s.i.

As long as the fluid pressure at switch 41 is above 15 p.s.i., the operator can increase or decrease the braking force as desired since contacts 41a remain closed, maintaining valve 40 open to allow the fluid to flow freely both from and to the receiver.

When it is desired to release the brake, the operator releases pedal 30, diaphragm 21 returns toward the right hand position as shown in FIGURE 1. The fluid now flows from the receiver through valve 40 to the transmitter, until the pressure at switch 41 drops to 15 p.s.i., whereupon contacts 41a open.

Upon opening of contacts 41a, devices 44, 45 and 40 are deenergized. Valve 40 closes, preventing further flow of the fluid from receiver 9 to transmitter 38, contacts 45a close, however, contacts 44a remain closed, even though relay 44 is deenergized, for the preset time delay period set by the adjustment of screw 56.

Thus, valve 42 is energized for the predetermined time interval during which contacts 44a of time interval during which contacts 44a of time delay relay 44 remain closed after deenergization of relay 44. Now the hydraulic circuit is from receiver 9, through line 50 to needle valve 43 and solenoid valve 42, to the top of reservoir 39 by way of lines 54. This permits an accurate rate of flow since the pressure at this time is always essentially 10 p.s.i., produced by the spring 20. That is, initially the pressure is 15 p.s.i. but drops rapidly to 10 p.s.i. during the metering period.

This accurate and preset rate of flow combined with the accurate and preset time delayed interval for the opening of contacts 44a results in an accurate metering of a preselected volume of fluid. This volume, always the same, provides an accurate and unvarying release distance of brake shoes 10, 12. This release distance is initially adjusted by means of the timing adjustment of relay 44 or the opening of needle valve 43, or both.

It is obvious that day to day operation of this brake will always result in the same brake shoe release distance, completely unaffected by brake lining wear, making the brake fully self-adjusting.

Each time the brake is applied clutch members 58, 59 will take a certain relative position, and each time the brake is released the shoes will have the same clearance to brake drum 14 since as shoe 12 backs away from drum 14 centering member 66 pivots clockwise causing rod 67 to pivot clutch member 59 counterclockwise through the same angular distance. When the brake is released clutch members 58, 59 pivot in unison.

It is important that pressure switch 41 be located close to receiver 9, since the pressure drop at the receiver does not follow the rapid drop of the transmitter. Thus, if the pressure switch is located near the transmitter, it will not be released at the appropriate moment and metering will not be uniform.

Although the invention herein has been described in connection with a preferred embodiment, it is to be understood that modifications and variations may be made therein and in its applications without departing from the broader scope thereof, as defined in the following claim.

I claim:

A brake means comprising a base, first and second brake arms, first and second brake shoe means mounted to said first and said second brake arms, respectively, a brake drum positioned between said brake shoe means, said brake arms maintaining said brake shoe means operatively positioned with respect to said drum; means pivotally mounting said brake arms to said base; biasing means acting upon said brake arms in directions urging said brake shoe means away from said drum; pressure means connected to each of said brake arms in a manner such that actuation of said pressure means forces said brake shoe means against said drum; said means pivotally mounting said brake arms being a first and a second pin keyed to said first and said second brake arms, respectively; an automatic brake shoe centering means operatively mounted to said pins to insure that said brake shoe means move equal distances away from said brake drum each time said pressure means is deactuated; said centering means comprising a clutch device, a first portion of said clutch device keyed to said first pin for movement in unison therewith, a second portion operatively mounted for pivotal movement relative to said first pin about an axis coinciding therewith, means providing operative engagement between said portions, a mechanical connecting means joining said second portion to said second said pin; said connecting means comprising a crank and a link; said crank securely fastened to said second pin and rotatable therewith; said link operatively connected between said second portion of said clutch and said crank such that upon deactuation of said pressure means said biasing means is effective to pivot said first and said second pins through equal angles but in opposite directions.

References Cited by the Examiner
UNITED STATES PATENTS 2,380,796    7/45    Schnell _____ 188—75
2,925,153    7/60    Hodgson _____ 188—75 X ARTHUR L. LA POINT, *Primary Examiner.*

DUANE A. REGER, *Examiner.*